United States Patent
Müller (10) Patent No.: US 7,845,701 B2
(45) Date of Patent: Dec. 7, 2010

(54) STORAGE COMPARTMENT FOR A MOTOR VEHICLE

(75) Inventor: Ralf Müller, Germersheim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 179 days.

(21) Appl. No.: 12/063,870

(22) PCT Filed: Jul. 4, 2006

(86) PCT No.: PCT/EP2006/063855

§ 371 (c)(1),
(2), (4) Date: Aug. 14, 2008

(87) PCT Pub. No.: WO2007/031351

PCT Pub. Date: Mar. 22, 2007

(65) Prior Publication Data

US 2009/0218842 A1   Sep. 3, 2009

(30) Foreign Application Priority Data

Sep. 12, 2005   (DE)   .................. 10 2005 043 593

(51) Int. Cl.
*B60R 7/04* (2006.01)
(52) U.S. Cl. .................. 296/37.1; 296/37.8; 296/37.13
(58) Field of Classification Search ..... 296/37.1–37.16, 296/24.34
See application file for complete search history.

(56) References Cited

U.S. PATENT DOCUMENTS 2,621,952 A * 12/1952 Gander .................. 292/196

(Continued)

FOREIGN PATENT DOCUMENTS

DE   41 30 847   3/1993

(Continued)

OTHER PUBLICATIONS

International Search Report published Sep. 26, 2007 for PCT/EP06/063855 filed Jul. 4, 2006.

(Continued)

*Primary Examiner*—Dennis H Pedder
(74) *Attorney, Agent, or Firm*—Martin Fleit; Paul D. Bianco; Fleit Gibbons Gutman Bongini & Bianco PL (57) ABSTRACT

The invention concerns a storage compartment for a motor vehicle with
 a container (110) and a container lid (112), arranged on the container in a pivotal fashion,
 a pivoted lever (116), arranged on the container lid,
 a first elastic element (120), whose first end (122) is connected with the container and whose second end (118) is connected with the pivoted lever, so that the first elastic element acts upon the container lid with a closing force and/or a closing torque,
 a locking element (126), which is mounted in a pivotal fashion, so that, in case of an impact of the motor vehicle, said locking element, due to its mass inertia, will be brought into a locking position for locking the pivoted lever into position, whereby the locking element is mounted in such a way that it is pivotal around the first end of the first elastic element, whereby the first elastic element is a dead center spring, and whereby the dead center spring is embodied in such a way that it exerts the closing force and/or closing torque as long as the open position of the container lid does not exceed a dead center (155) position.

18 Claims, 6 Drawing Sheets

U.S. PATENT DOCUMENTS

| | | | |
|---|---|---|---|
| 4,552,399 A | 11/1985 | Atarashi et al. | |
| 6,278,676 B1 * | 8/2001 | Anderson et al. | 720/654 |
| 7,328,825 B2 * | 2/2008 | Kaiser | 224/543 |
| 2006/0255610 A1 * | 11/2006 | Bejin et al. | 296/37.1 |

FOREIGN PATENT DOCUMENTS

| | | |
|---|---|---|
| DE | 203 11 467 | 9/2003 |
| DE | 20 2004 003 227 | 7/2004 |
| WO | 2005/083212 | 9/2005 |

OTHER PUBLICATIONS

English Translation of Written Opinion published Apr. 17, 2008 for PCT/EP06/063855 filed Jul. 4, 2006.

English Translation of International Preliminary Report on Patentability published Apr. 8, 2008 for PCT/EP06/063855 filed Jul. 4, 2006.

* cited by examiner

STORAGE COMPARTMENT FOR A MOTOR VEHICLE

FIELD OF THE INVENTION

The invention concerns a storage compartment for a motor vehicle, as well as an internal motor vehicle trim paneling, such as the trim panel for a door interior, a center console, a trunk trim paneling, and a motor vehicle door with a storage compartment.

BACKGROUND OF THE INVENTION

Aside from convenient operation, a storage compartment for the interior of a motor vehicle has to provide a high degree of functional safety. It must be prevented that, in case of an accident or crash, the storage compartment opens on its own or else items placed in said storage compartment could be propelled out from the storage compartment with considerable velocity, which could represent an endangerment and possibly cause injury of persons present in the interior of such a motor vehicle.

From DE 20 2004 003 227 U1, we know of a locking device for the cover of openings inside of vehicles. Said locking device has a closure element that is firmly held in place on two sides. By means of the locking tab of a rocker engaging into a latch, the latches of the locking device are locked in a terminal closure position. Without operating an opening handle, any opening by itself is thus eliminated.

From DE 100 27 020 B4, we know of a vehicle center console with crash lock. Said crash lock is intended to prevent that the drawer of that center console, due to its inertia, will be propelled backward from the center console in case of a crash of the motor vehicle. The trigger of that crash lock is activated solely based on the inertia forces of the components. The triggering of the crash lock occurs only at the time when the drawer begins to move outward [from the center console].

From DE 102 00 102 A1 a crash-active locking mechanism of kinematic components in the interior of vehicles is known. The locking device features an actuator for a locking member, which is controlled by an acceleration sensor of an airbag control unit.

DE 203 11 467 U1 deals with a further assembly component for the interior of motor vehicles with a crash locking device.

From DE 41 30 847 C2, we know a closing lid for closing a storage compartment in the interior of a motor vehicle. In case an acceleration force of more than 10 g occurs, the storage compartment is automatically locked in position.

SUMMARY OF THE INVENTION

In comparison to the above, the invention herein has the purpose of creating an improved storage compartment for a motor vehicle, as well as for motor vehicle interior trim panel components, such as interior door trim panels, a center console, the trim paneling of a trunk, and a motor vehicle door with such a storage compartment.

The tasks this invention is based upon are each solved by means of the characteristics of the independent patent claims. Preferred embodiments of the invention are represented in the dependent claims.

By means of the invention, a storage compartment for a motor vehicle is created, which comprises a container with a container cover positioned thereon in a pivotal fashion. The container lid has a pivoted lever. There is an elastic element, i.e., a dead center spring, which at its one end is connected with the container and, on its second end, is connected with the pivoted lever. In this way, the dead center spring acts with a closing force or a closing torque upon the container lid as long as the open position of the container lid has not exceeded the dead center. In order to keep the container lid closed under normal circumstances, an elastic band or some such device may be used in place of a dead center spring. The closing force or closing torque can be set up to act directly upon the container lid or indirectly upon the locking mechanism of the container lid, in order to keep said container lid closed.

The invention herein is particularly advantageous in that the locking element is positioned in such a way that it may be pivoted around the first end of the elastic elements, i.e., the dead center spring, whereby the first end is connected to the container. This permits an especially compact design with reliable functionality even at high acceleration forces.

The storage compartment features a locking element that is positioned in a pivotal fashion so that, in case of an impact of the motor vehicle, said locking element, due to its inertia, is brought into a locking position for locking the pivoted lever.

The invention herein also allows for a compact design of a storage compartment with a crash-locking feature. This is possible because the locking element in its locking position serves to hold the pivoted lever that is necessary for normal operation anyway.

According to one embodiment of the invention herein, the locking element is positioned where it can pivot around the first end of the dead center spring. This allows for an especially compact design.

In one embodiment of the invention, the locking element is designed in a latch-like shape. For example, in order to engage in the locking position with a corresponding hook-like shape of the pivoting lever, the locking element has a hook-like shape at the end facing away from the pivoting axis. The locking position of the locking element in this case is defined by the hook-like shape of the pivoting arm and/or by one or more stops for the locking element.

One embodiment of the invention herein has a bearing pin for the locking element positioned on the container. This bearing pin forms the pivoting axis for the locking element. The bearing pin has a recess for receiving the first end of the dead center spring, which is positioned following along the pivoting axis into the bearing pin.

In a further embodiment of the invention, the container lid can be opened upward. Said container is integrated, for example, into an interior door trim panel, so that, for example, a storage compartment is created in the driver's door or the passenger door.

One embodiment of the invention has the locking element connected to an elastic element. Said elastic element has the purpose of holding the locking element under normal operating conditions of the motor vehicle outside the locking position so that, under normal operating conditions of the motor vehicle, the container lid may be opened, in order to place items into the storage compartment or to remove them therefrom. In case of an acceleration that does not occur under normal operating conditions of the motor vehicle, the locking element, due to its mass inertia, is moved into the locking position [by moving] in a direction contrary to the spring loads exerted by the elastic element.

The elastic element also serves as protection against rattling, [and] in order to keep the locking element in its normal position when the motor vehicle is moving on an uneven street or through potholes.

One embodiment of the invention has the elastic element act upon an arm of the locking element. This causes a torque to be exerted upon the locking element. In order to set the locking element into motion, an acceleration of sufficient magnitude is necessary to act upon the locking element to overcome that torque.

In one embodiment of the invention, the elastic element is a compression spring.

According to an additional embodiment of the invention, the mass-spring system comprised of the dead center spring and the container lid is constructed in such a way that the container lid remains closed up to a first acceleration. The second mass-spring system, consisting of the locking element and the elastic element on the other hand, is formed in such a way that the locking element, up to a second acceleration, remains in its normal position, whereby the second acceleration is less than the first acceleration.

In case of the occurrence of a large acceleration of, for example, 40 g, such as when the motor vehicle in case of a rollover impacts onto the road with the roof pointing downward, this ensures that the locking element already has reached its locking position before the container lid can come open. This way, in other words, the mass-spring system comprised of locking element and the elastic element overtakes the mass-spring system consisting of the dead center spring and the container lid. Depending on the choice of geometry and/or the mass and the spring strength [involved], a slight opening of the container lid may occur, at which, however, no items can fall out of the container yet. For example, the locking position can be fixed by the corresponding stops. Alternately, it is also possible that the locking position is derived from the positions of the locking element and of the lever of the container lid when they both meet.

According to one embodiment of the invention, the first acceleration is at between three and five times the acceleration of gravity (g), in particular, at about 4.3 g, while the second acceleration ranges between 1 g and 3 g, [but] preferably about 2.3 g.

One embodiment of the invention has the difference between the first and the second acceleration at least 1 g, preferably about 2.3 g.

In a further aspect, the invention herein relates to a motor vehicle interior trim panel item with integrated storage space, such as, for example, a storage compartment, which features a crash lock as per the invention herein. The motor vehicle interior trim panel item can be, for example, a door trim panel, a center console, or an interior trunk trim panel.

In a further aspect, the invention herein relates to a motor vehicle door with integrated storage compartment, which features a crash lock as per the invention herein.

BRIEF DESCRIPTION OF THE DRAWINGS

In the following, preferred embodiments of the invention are explained with reference to the illustrations, wherein.

DETAILED DESCRIPTION OF THE INVENTION

Figure 1:
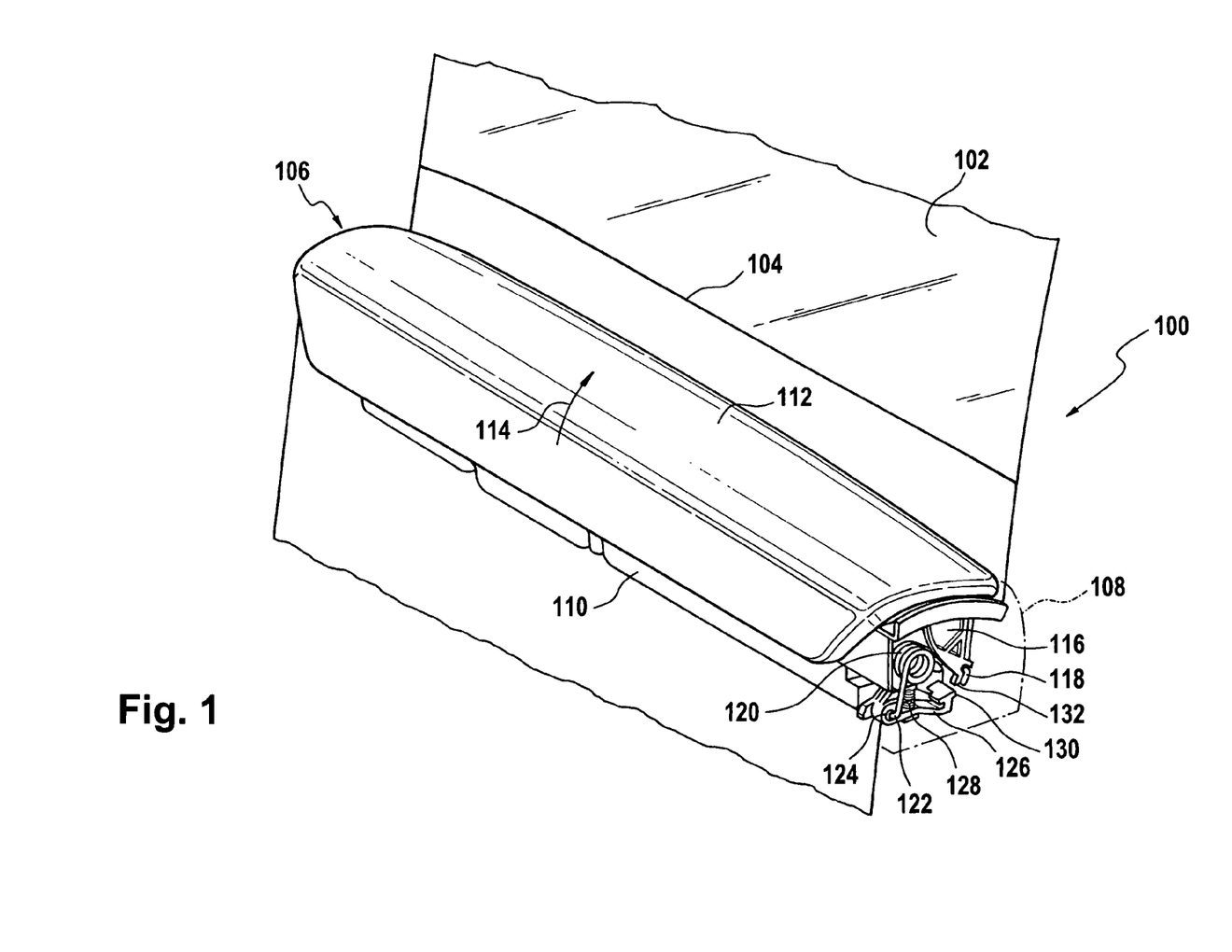
FIG. 1 shows a foreshortened representation of an embodiment of a storage space as per the invention herein, which is formed as a storage compartment in the interior door trim paneling of the driver's door of a motor vehicle.

FIG. 1 shows a motor vehicle door 100 with a window 102 and a storage compartment 106 as arranged below a door shoulder 104. Storage compartment 106 is part of the door trim panel of motor vehicle door 100. Storage compartment 106 is closed in driving direction by a switch cover 108, which in FIG. 1 is indicated by hashed lines. Switch cover 108 serves to receive various operating elements, such as, for example, for operating the window regulator for window 102.

Storage compartment 106 features a container 110, which has a container opening accessible from the top. The container opening of container 110 is closed by a container lid 112. Container lid 112 is attached to container 110 in a pivotal fashion and can be pivoted upward in the direction of arrow 114 in order for an item to be placed into or removed from the storage compartment formed by container 110 through the thus accessible container opening.

Container lid 112 has a pivoted lever 116, which is firmly attached to container lid 112. Container lid 112 and pivoted lever 116 may be embodied in a single component, such as, for example, one part shaped from a plastic material.

Dead center spring 120, which at one of its ends 122 is connected with container 110, acts with its [other] end 118 upon pivoted lever 116. In the position of the container lid 112 shown in FIG. 1, a closing force or torque is applied to container lid 112 by means of dead center spring 120, which by operating container lid 112 in the direction of arrow 114 can be overcome by a user in order to open container lid 112.

After, due to the movement of container lid, 112, a dead center has been passed, dead center spring 120 causes an opening force or opening torque to be applied to container lid 112, so as to support the opening motion and then to keep container lid 112 in an open position. In order to once more close container lid 112, this opening force or torque can be overcome by the user by operating container lid 112 against the direction of arrow 114.

Container 110 has a bearing pin 124, which features a longitudinally positioned recess, which at its end 122 receives dead center spring 120. A locking latch 126 is located in a pivotal fashion at bearing pin 124. In its normal position, as shown in FIG. 1, locking latch 126 is held by a compression spring 128.

At the one of its ends that is pointing away from bearing pin 124, locking latch 126 has a hook 130, which is shaped in order to engage with a hook 132 embodied into the corresponding end of pivoted lever 116 in a locking position.

Figure 2:
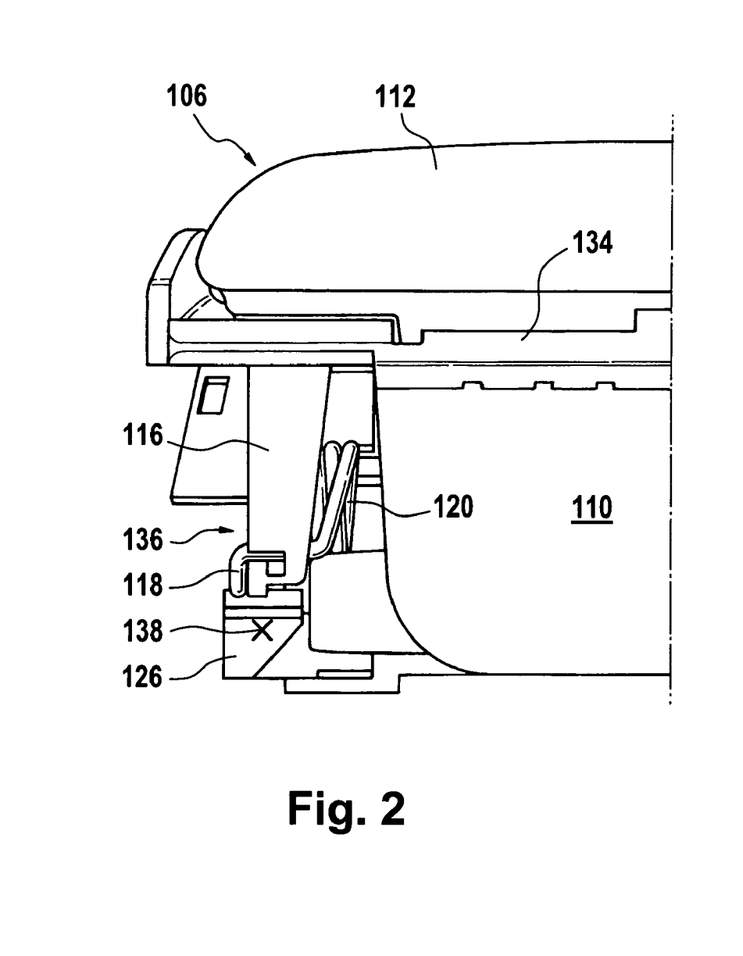
FIG. 2 shows a side view of the anterior section of the storage compartment.

FIG. 2 shows a side view of storage compartment 106, shown in FIG. 1 with closed container lid 112 and in normal position of locking latch 126, meaning under normal operating conditions of the motor vehicle. FIG. 2 shows a hinge 134 by means of which container lid 112 is mounted at container 110 in a pivotal fashion. Furthermore, FIG. 2 shows a passageway 136 at the outer end of pivoted lever 116, through which end 118 of dead center spring 120 is guided. End 118 of the dead center spring is angled, so that end 118 cannot slip out from passageway 136.

FIG. 2 also shows the position of point of gravity 138 of locking latch 126.

Figure 3:
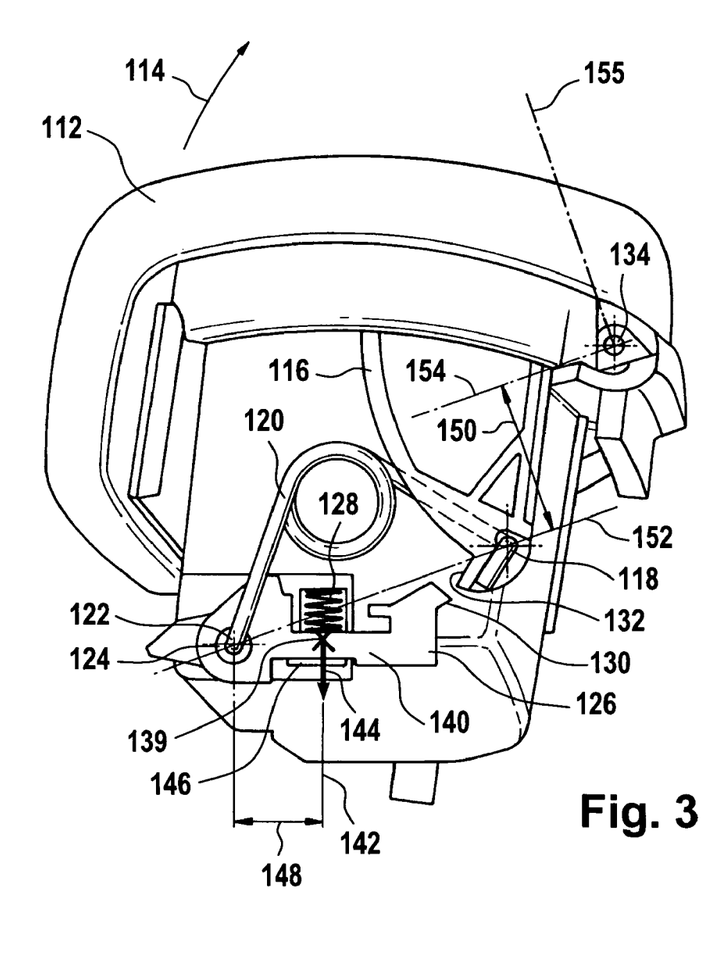
FIG. 3 shows a front view of the storage compartment in FIG. 1.

FIG. 3 shows storage compartment 106 in a head-on view. In the embodiment shown here, compression spring 128 is placed in such a way that the location of its point of application of force 139 on the arm 140 of locking latch 126 comes to approximately coincide with line 142, which traverses point of gravity 138 in a vertical direction.

By means of compression spring 128, a spring load 144 is applied at point of application of force 139, so that locking latch 126 is pressed against a stop 146, which is formed on container 110.

Since line 142 is at a distance 148 from the pivoting axis of locking latch 126, as defined by bearing pin 124, a corresponding force 144 is therefore acting upon arm 140, which is holding locking latch 126 in the normal position shown in FIG. 3.

Dead center spring 120, whose end 122 is placed into the recess of bearing pin 124, is pre-loaded so that dead center spring 120 acts upon container lid 112 with a closing force or closing torque. The value of this closing torque is derived from distance 150 between line 152 connecting the pivoting axis of locking latch 126 and the passageway 136 and line 154, traversing through the pivoting axis of container lid 112 parallel to line 152.

When container lid 112 is moved into the direction of arrow 114 beyond the dithered angle position 155, that is, beyond the so-called dead center, dead center spring 120 acts upon container lid 112 with an opening torque instead of with a closing torque, in order to support the opening movement of container lid 112 or to keep it in its open position.

Figure 4:
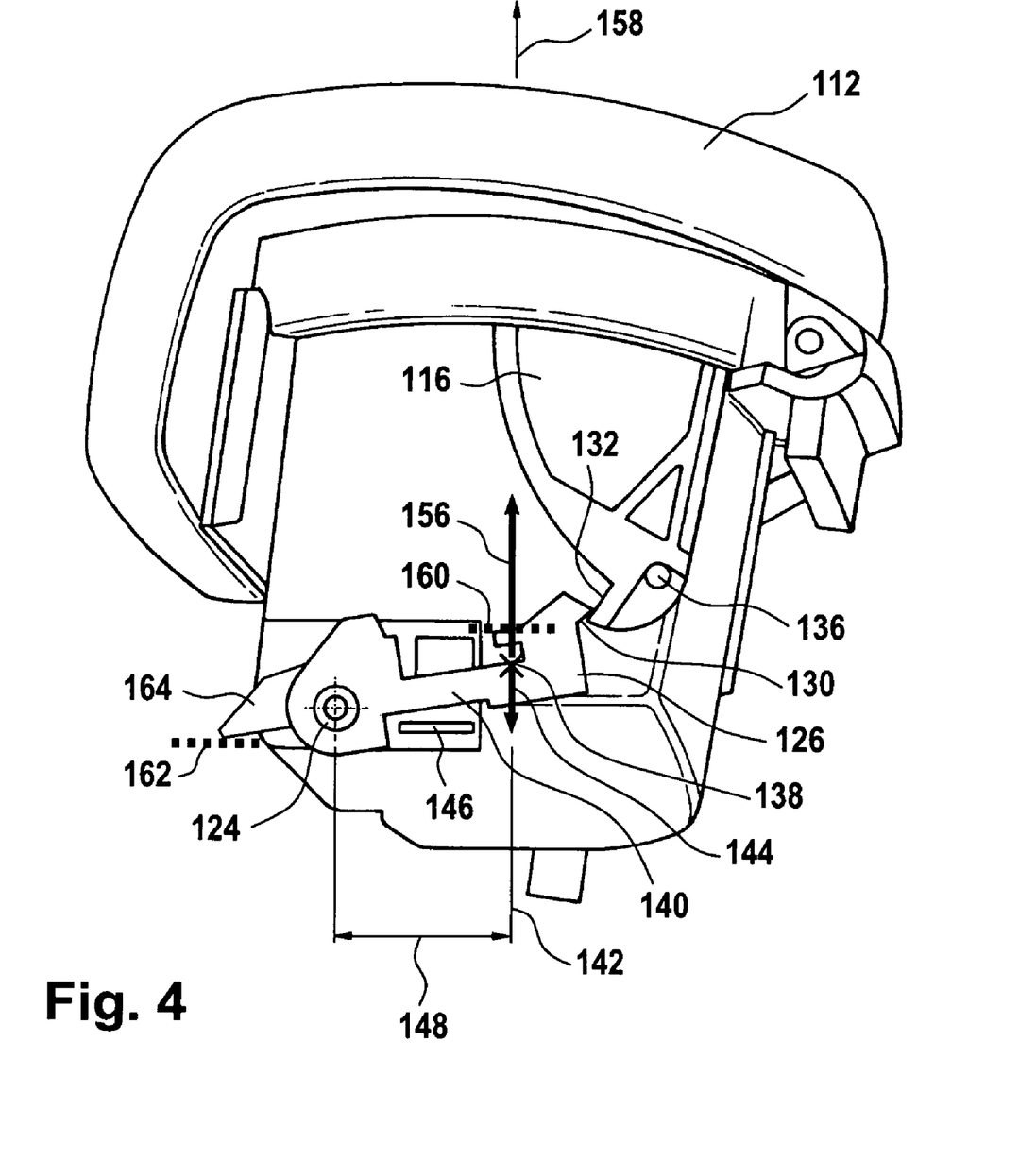
FIG. 4 shows the view of the storage compartment in FIG. 3, whereby the locking element is located in its locking position.

FIG. 4 shows storage compartment 106 in a locking position of locking latch 126, which it has assumed due to an impact. For purpose of clarity, dead center spring 120 and compression spring 128 are not shown in FIG. 4.

If, for example, a rollover of the motor vehicle occurs in the course of an accident and the motor vehicle impacts onto the road with the roof pointing downward, an acceleration force 156 into a direction opposed to spring load 144 acts upon point of gravity 138 of locking latch 126. A corresponding acceleration force 158 also acts upon container lid 112.

Spring load 144 and the mass of locking latch 126 are designed in such a way that the retaining force caused by spring load 144, which keeps locking latch 126 in its normal position, is already overcome in case of an acceleration that is less than the closing force applied by dead center spring 120 onto container lid 112. This causes the mass-spring system comprised of locking latch 126 and compression spring 128 (for clarity not represented in FIG. 4) to overtake the mass-spring system consisting of dead center 120 spring and container lid 112, which causes locking latch 126 to reach the locking position shown in FIG. 4, provided container lid 112 has not yet or not yet significantly opened.

In their locking position, hooks 130 and 132 interlock so that container lid 112 is held in place by locking latch 126.

Thereby, the pivoting motion of locking latch 126 into its locking position is limited by the interlocking hooks 130 and 132 and/or by stop 160 formed on the wall of container 110 and/or by a stop 162, which may be formed by a surrounding component of the motor vehicle door trim panel with a tab 164 of locking latch 126.

Due to the lead of the spring-mass system, comprised of locking latch 126 and compression spring 138, container lid 112 is locked in a fixed position as soon as it begins to move and, in that instance, will not be opened or only opened slightly, so that no items, or at least not larger items, can fall out from the container when the vehicle has an impact onto the road with the roof pointing downward. For example, container lid 112 will be opened a maximum of 10°, or, for example, about 7°, 3.75°, or 1.5°, depending on the spring loads and mass relationships selected, as well as on the geometry of hooks 130, 132 and, if applicable, that of stops 160 and 162. When compression spring 128 has a small spring rate and spring load 144 is as low, an embodiment of storage compartment 106 is possible in such a way that, in the locking position, container lid 112 is not or barely open.

After the recovery from acceleration forces 156 and 158, i.e., after conclusion of the impact process, container lid 112 will, due to the closing torque applied by dead center spring 120, once again be fully closed. Preferably, hooks 130, 132 move away from each other so that locking latch 126 pivots back into its normal position. This allows for container lid 112 to be opened with no destruction even after such an impact.

The spring-mass system comprised of locking latch 126 and compression spring 128 is dimensioned, for example, in such a fashion that, in case of an acceleration of between 1 g and 3 g in the direction of acceleration force 156, the retaining force applied by compression spring 128 is overcome. The mass-spring system comprising dead center spring 120 and container lid 112, on the other hand, is dimensioned so as to have the closing torque exerted by dead center spring 120 overcome only at higher acceleration values of between 3 g and 5 g. The differential between these acceleration values preferably is at least 1 g, but preferably it is about 2.3 g. This can be achieved, for example, with a mass of locking latch 126 of about 15 g and a spring load 144 of compression spring 128 of 0.3 N, whereby container lid 112 has, for example, a mass of about 360 g, and dead center spring 120 acts with a closing torque of 580 Nmm upon container lid 112. Such a dimensioning has the consequence that, at an acceleration of 2.3 g, the retaining force exerted by compression spring 128 is overcome, and at an acceleration of 4.3 g, the closing torque caused by dead center spring 120 is overcome.

Figure 5:
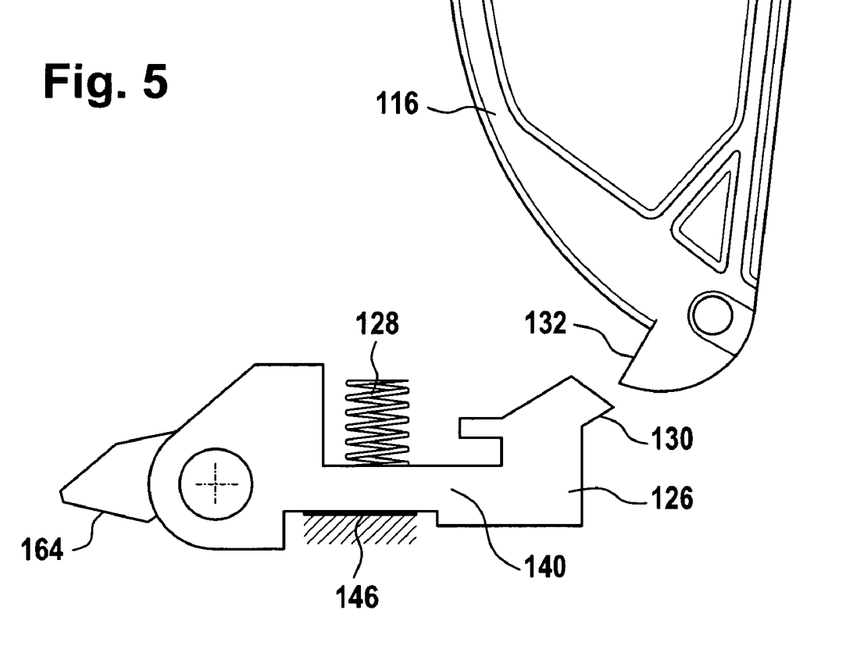
FIG. 5 shows a detail view of the locking element and of the pivoted lever of the embodiments as shown in FIG. 1 through 4 as they are in its normal position.

FIG. 5 shows a detailed view of locking latch 126 and of pivoted lever 116 of the embodiments in FIGS. 1 through 4, whereby pivoted lever 116 is in normal position. In the position shown in FIG. 5, container lid 112 is closed.

Figure 6:
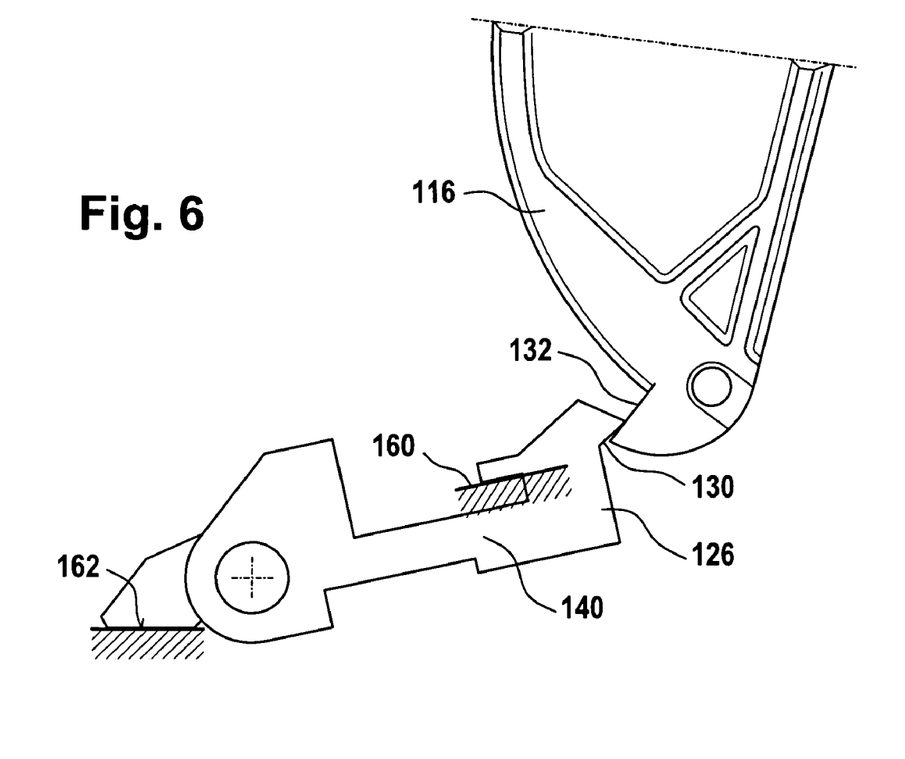
FIG. 6 shows the view as in FIG. 5 in locking position.

FIG. 6 shows locking latch 126 in its locking position. The locking position of locking latch 126 is determined by stops 160 and/or 162.

Figure 7:
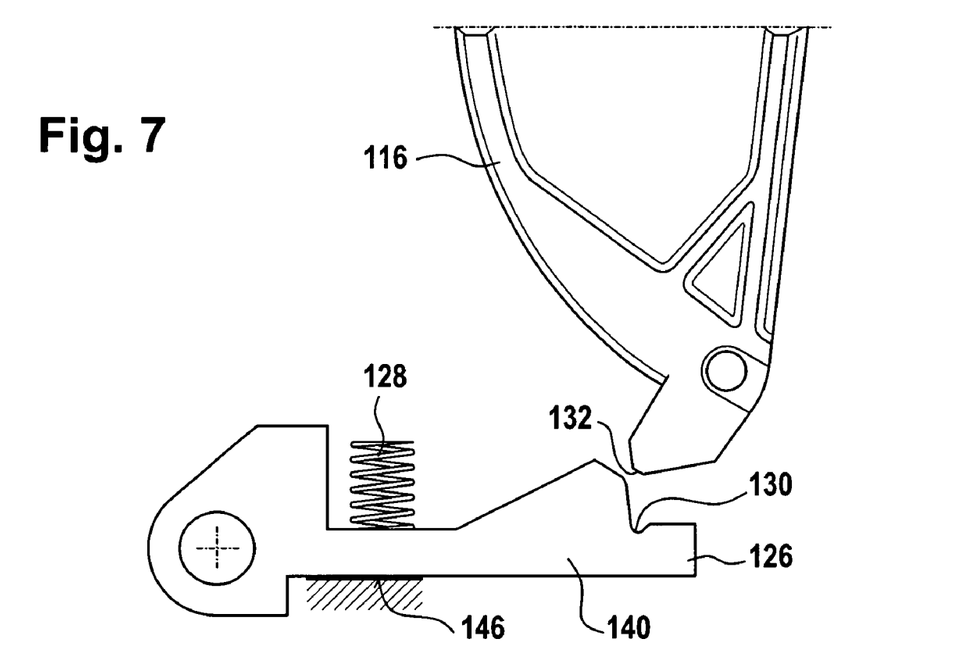
FIG. 7 shows an alternative embodiment of both the locking element and the pivoting hook in normal position.
Figure 8:
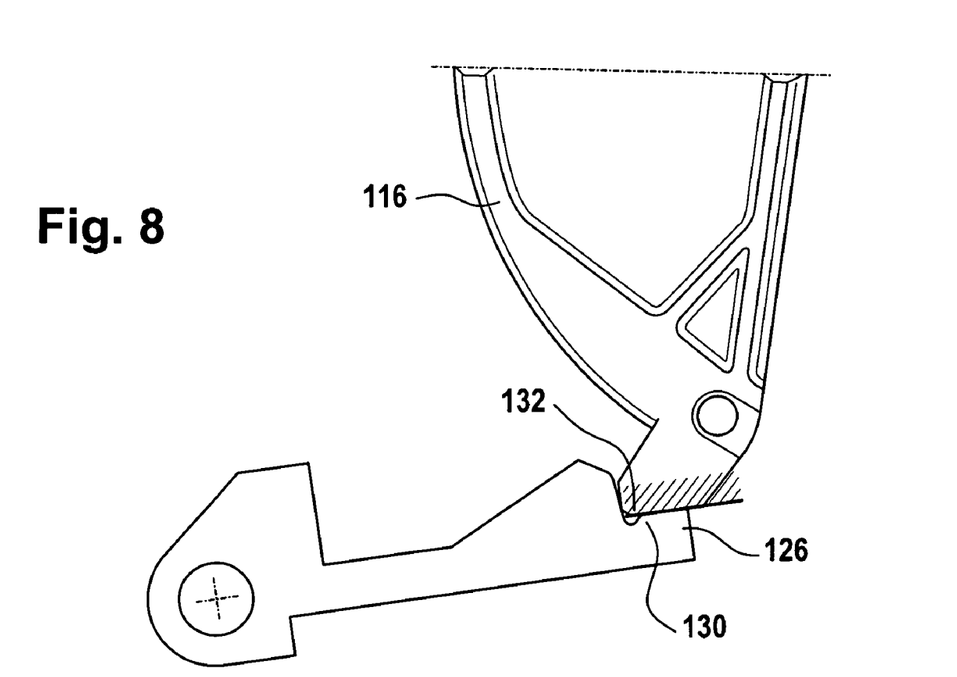
FIG. 8 shows the view as in FIG. 7 in locking position.

FIG. 7 shows an alternative embodiment of locking latch 126, as well as of pivoted lever 116 with locking latch 126 in normal position at container lid 112 closed. In the embodiment in FIG. 7, the locking position of locking latch 126 is determined by the stop formed by hooks 130 and 132, as shown in FIG. 8. In this embodiment, no additional stop is formed by locking latch 126 on container 110 or on a surrounding component.

Figure 9:
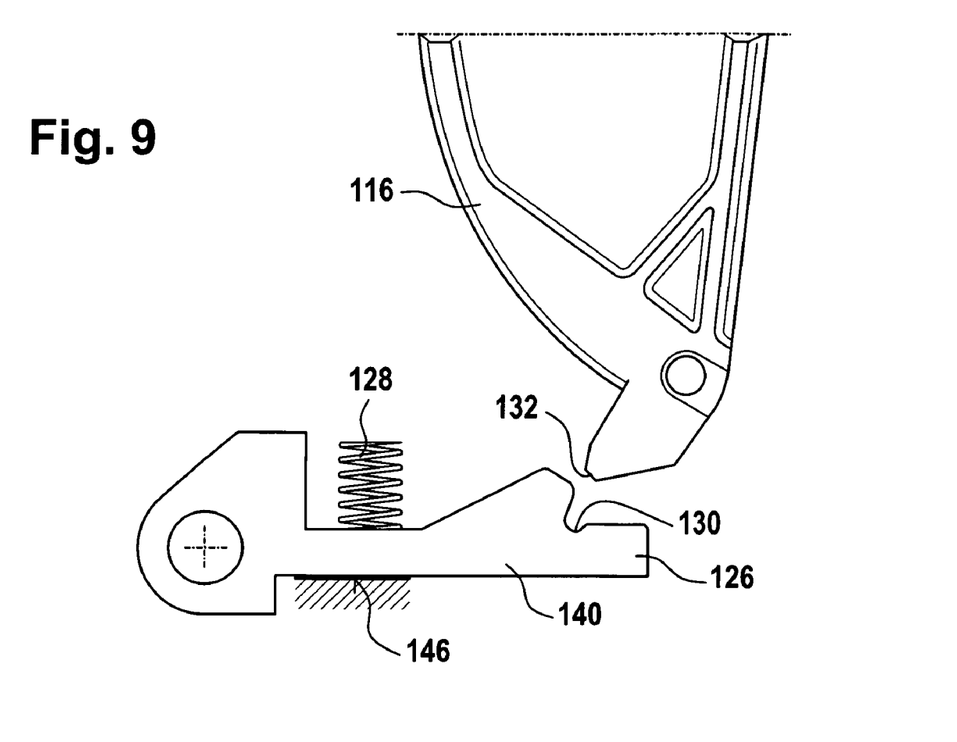
FIG. 9 shows a further embodiment of the locking element and the pivoting hook in normal position.
Figure 10:
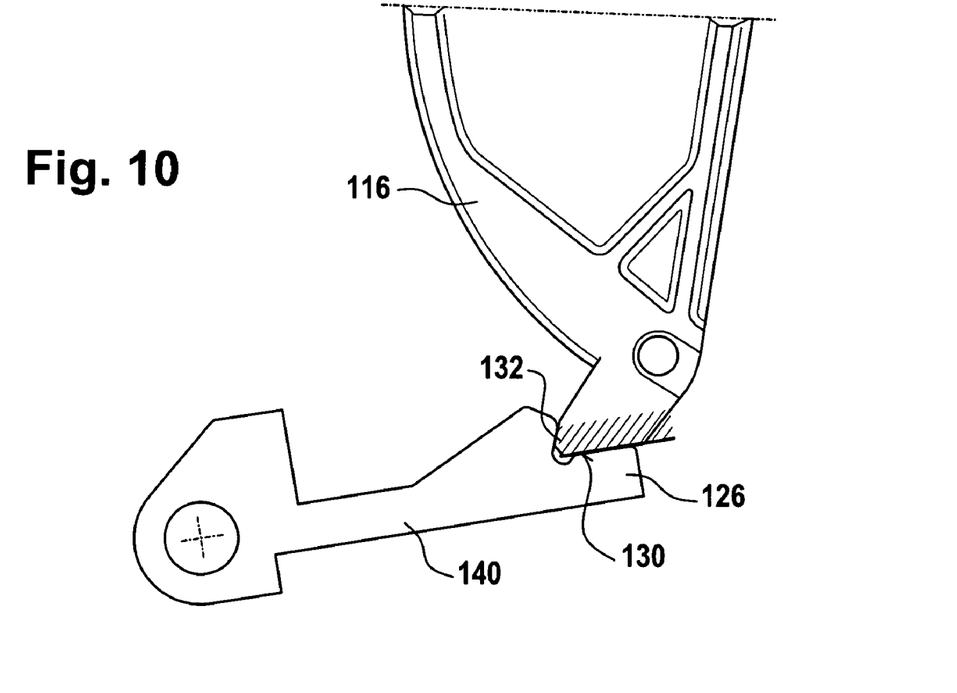
FIG. 10 shows the view of FIG. 9 in locking position.

FIG. 9 shows an alternative embodiment of hooks 130 and 132 in the embodiments shown in FIGS. 7 and 8. Here, hooks 130 and 132 are formed in such a way that the result is a slight opening angle of container lid 112 in the locking position shown in FIG. 10.

LIST OF REFERENCE NUMBERS 100 motor vehicle door
102 window
104 door shoulder
106 storage compartment
108 switch cover
110 container
112 container lid
114 direction of arrow
116 pivoted lever
118 end 120 dead center spring
122 end
124 bearing pin
126 locking latch
128 compression spring
130 hook
132 hook
134 hinge
136 passageway
138 point of gravity
139 point of application of force
140 arm
142 line
144 spring load
146 stop
148 distance
150 distance
152 line
154 line
155 angle position
156 acceleration force
158 acceleration force
160 stop
162 stop
164 tab

The invention claimed is:

1. Storage compartment for a motor vehicle with
a container (110) and a container lid (112), arranged thereupon in a pivotal fashion,
a pivoted lever (116) associated with the container lid,
a first elastic element (120), whose first end (122) is connected with the container and whose second end (118) is connected with the pivoted lever, so that the first elastic element acts upon the container lid with a closing force and/or a closing torque,
a locking element (126), which is located in a pivotal fashion, so that, in case of an impact of the motor vehicle, said locking element, due to its mass inertia, is moved into the locking position for locking the pivoted lever in position,
wherein the locking element is positioned in a pivotal fashion around the first end of the first elastic element, and wherein the first elastic element is a dead center spring, whereby the dead center spring is embodied in such a way that it exerts the closing force and/or closing torque as long as the open position of the container lid does not exceed a dead center (155) position, and
wherein a second elastic element (128) resiliently restrains the locking element, in order to keep the locking element outside the locking position under normal operating conditions of the motor vehicle.

2. Storage compartment as in claim 1, wherein the locking element is embodied in a latch-like shape.

3. Storage compartment as in claim 1, wherein a bearing pin (124) for the locking element is arranged at the container and said bearing pin features a recess for receiving the first end of the first elastic element.

4. Storage compartment as in claim 1, wherein the locking position is defined for the locking element by a stop (160, 162).

5. Storage compartment as in claim 4, wherein the stop is arranged at a wall of the container and/or on a surrounding component.

6. Storage compartment as in claim 1, wherein the container lid is pivotal upward, so that an upper opening of the container becomes accessible.

7. Storage compartment as in claim 1, wherein the second elastic element is connected with an arm (140) of the locking element.

8. Storage compartment as in claim 1, wherein the second elastic element is a compression spring (128).

9. Storage compartment as in claim 1, wherein the first elastic element and the container lid are embodied in such a way that the container lid remains closed up to a first acceleration, and wherein the locking element and the second elastic element are embodied in such a way that the locking element remains in its normal position up to a second acceleration, wherein the second acceleration is of lesser magnitude than the first acceleration.

10. Storage compartment as in claim 9, wherein the first acceleration is in the range of between 3 g and 5 g, and the second acceleration is between 1 g and 3 g.

11. Storage compartment as in claim 9, wherein the difference between the first and the second acceleration is at least 1 g.

12. Storage compartment as in claim 11, wherein the difference between the first and the second acceleration is at least about 2.3 g.

13. The combination of a motor vehicle interior trim panel and a storage compartment mounted thereon, said storage compartment comprising a container mounted to said panel and a container lid arranged thereupon in a pivotal fashion, a pivoted lever associated with the container lid, a first elastic element, whose first end is connected with the container and whose second end provides a resilient force on the pivoted lever, so that the first elastic element acts upon the container lid with a closing force and/or a closing torque, a locking element located in a pivotal fashion, so that, in case of an impact of the motor vehicle, said locking element, due to its mass inertia, is moved into the locking position for locking the pivoted lever in position, wherein the locking element is positioned in a pivotal fashion around the first end of the first elastic element, and wherein the first elastic element is a dead center spring, whereby the dead center spring is embodied in such a way that it exerts the closing force and/or closing torque as long as the open position of the container lid does not exceed a dead center position, and wherein a second elastic element restrains the locking element, in order to keep the locking element outside the locking position under normal operating conditions of the motor vehicle.

14. A motor vehicle door having a storage compartment, said storage compartment comprising a container mounted to said door and a container lid arranged thereupon in a pivotal fashion, a pivoted lever associated with the container lid, a first elastic element, whose first end is connected with the container and whose second end provides a resilient force on the pivoted lever, so that the first elastic element acts upon the container lid with a closing force and/or a closing torque, a locking element located in a pivotal fashion, so that, in case of an impact of the motor vehicle, said locking element, due to its mass inertia, is moved into the locking position for locking the pivoted lever in position, wherein the locking element is positioned in a pivotal fashion around the first end of the first elastic element, and wherein the first elastic element is a dead center spring, whereby the dead center spring is embodied in such a way that it exerts the closing force and/or closing torque as long as the open position of the container lid does not exceed a dead center position, and wherein a second elastic element restrains the locking element, in order to keep the locking element outside the locking position under normal operating conditions of the motor vehicle.

15. A motor vehicle having driver and passenger doors that extend in the direction of vehicle travel and an elongated storage compartment mounted in at least one door that extends in the direction of vehicle travel and includes a container and a container lid, arranged thereupon by a pivot that extends in the direction of vehicle travel so that opening and closing of the lid is accomplished by applying a force normal to the direction of vehicle travel, a pivoted lever having a first end fixed to the container lid and a second end depending downwardly and terminating in a free end formed as a hook that executes a defined pivotal path responsive to opening and closing of the lid, an elastic element having a first end connected with the container and a second end biasing the pivoted lever, so that the elastic element acts upon the container lid via the pivoted lever with a closing force and/or a closing torque, said elastic element acting as a dead center spring, whereby the dead center spring is embodied in such a way that it exerts the closing force and/or closing torque as long as the open position of the container lid does not exceed a dead center position, a locking element having a first end pivotally mounted on the container about the first end of the elastic element connected to the container and a second end that extends toward the free end of the pivoted lever and terminates in a latch juxtaposed below the free end of the pivoted lever at its end of its pivotal path when the lid is closed, said locking element, in case of an impact of the motor vehicle of predetermined force being experienced laterally of vehicle travel, and due to its mass inertia, pivots upwardly relative to the free end of the pivotal lever into its pivotal path and its terminal latch engages the hook at the free end of the pivotal lever, thereby blocking any pivotal movement of the pivotal lever along its pivotal path and prevents the lid from opening during impact.

16. A motor vehicle according to claim 15 wherein the connection between the first end of the elastic element and the container is provided by a pin fixed in the container, said pin having a recess in its end for receiving and holding said first end of said elastic element, and said first end of said locking element being provided with an opening whereby it is pivotally received on said pin.

17. A motor vehicle according to claim 15 further including a blocking stop for the locking element that engages the locking element when the locking element is blocking the pivotal lever.

18. A motor vehicle according to claim 15 further including a resting stop for the locking element that engages the locking element when the locking element is removed from the pivotal lever.

* * * * *